United States Patent [19]

Pelagio

[11] 4,140,508
[45] Feb. 20, 1979

[54] METHOD AND APPARATUS FOR COLLECTING STRAND FORMED FROM STREAMS OF MOLTEN MATERIAL

[75] Inventor: Gregory A. Pelagio, Swansea, Mass.

[73] Assignee: Owens-Corning Fiberglas Corporation, Toledo, Ohio

[21] Appl. No.: 844,771

[22] Filed: Oct. 25, 1977

[51] Int. Cl.² .............................................. C03B 37/04
[52] U.S. Cl. .......................................... 65/4 R; 65/5; 65/9; 65/16; 156/62.4; 264/12; 264/121; 425/7
[58] Field of Search ................ 65/4 R, 9, 11 R, 5, 65/16, 11 W; 264/12, 121; 425/7; 156/62.4

[56] References Cited

U.S. PATENT DOCUMENTS

| 2,664,671 | 1/1954 | Courtney et al. | 65/11 W |
| 2,897,874 | 8/1959 | Stalego et al. | 65/4 R X |
| 3,442,633 | 5/1969 | Perry | 65/9 X |

FOREIGN PATENT DOCUMENTS

| 495512 | 11/1950 | Belgium | 65/11 W |
| 1027851 | 4/1958 | Fed. Rep. of Germany | 65/4 |

Primary Examiner—Robert L. Lindsay, Jr.
Attorney, Agent, or Firm—Ronald C. Hudgens; Philip R. Cloutier; Greg Dziegielewski

[57] ABSTRACT

This invention relates to a method and apparatus for collecting strands formed from streams of molten material issuing from orifices in a feeder having a blower positioned to direct gas into contact with streams of molten material to attenuate the streams into filaments. A walled passageway is positioned for the passage therethrough of the gas from the blower and the filaments. The passageway is adapted with a plurality of apertures adapted for the passage of a gas therethrough. Means for collecting the filaments into a continuous strand is positioned for contact with the filaments passed through the walled passageway.

10 Claims, 2 Drawing Figures

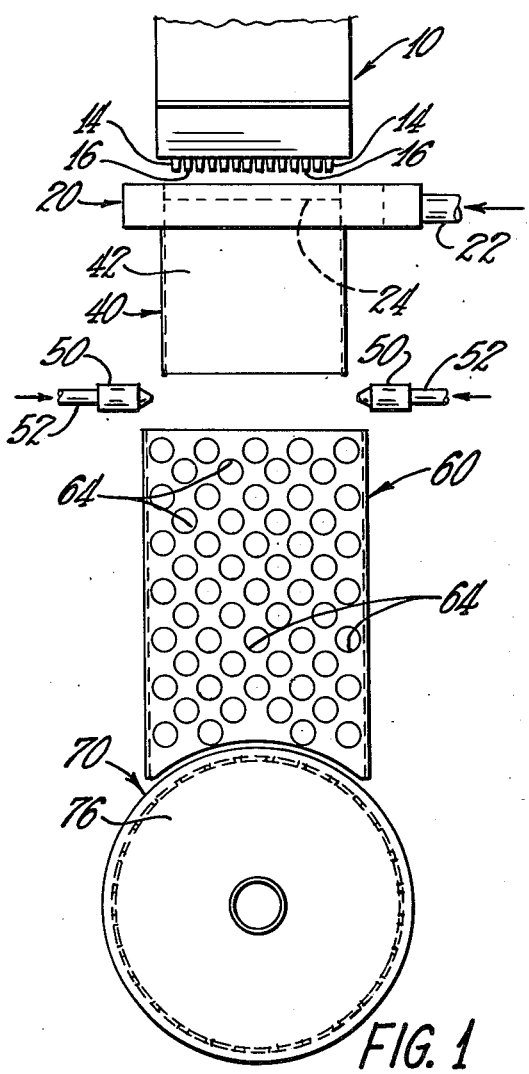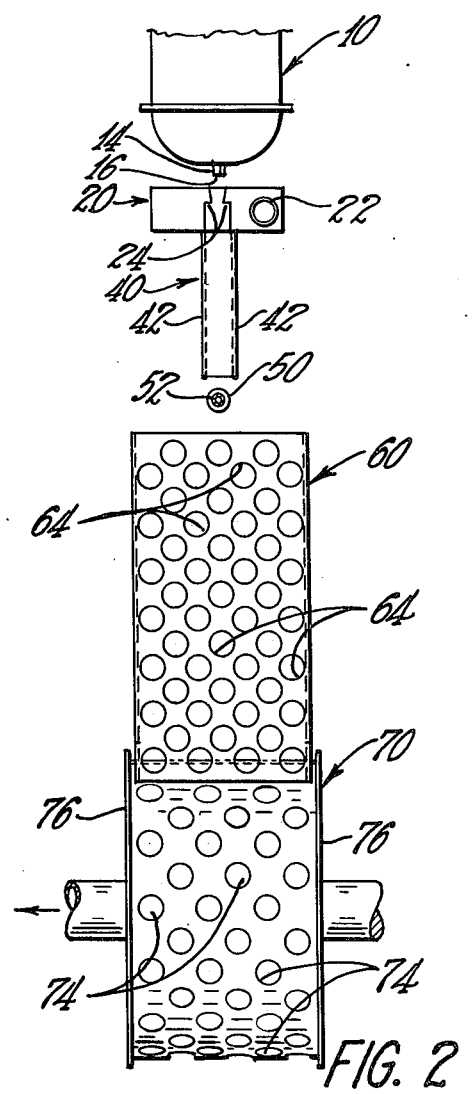
FIG. 1
FIG. 2

METHOD AND APPARATUS FOR COLLECTING STRAND FORMED FROM STREAMS OF MOLTEN MATERIAL

This invention pertains to a method and apparatus for collecting strands formed from streams of molten material. In one of its more specific aspects, the present invention relates to reducing the velocity of filaments that have been attenuated with blast of a fluid from a blower so that the filaments can be collected and formed into a strand.

In the past the filaments have been formed by using feeders for holding molten material. A plurality of orifices is located in the lower region of the feeder and streams of molten material issue from the orifices. The streams of molten material pass between two blowers located beneath the feeder and jets of a fluid, preferably air, from the blower attenuate the streams of molten material into filaments. The filaments formed are usually deposited onto a rotating drum where the filaments are gathered together and removed from the drum as a strand. Generally the filaments are deposited onto a porous surface of the drum, and the porous surface is connected to a source of vacuum so that the filaments will more easily adhere to the surface of the drum.

In this process it is necessary that the rotating drum be located fairly close to the orifices and blower so that the filaments can be properly directed onto the rotating drum. Because of the close proximity of the drum the filaments will not wander or be blown away from the porous surface of the drum. However, since the drum is close to the blower, the fluid from the blower can cause the filaments to travel at such a high velocity that the filaments hit the porous surface of the drum and the suction is not strong enough to hold the fibers on the surface of the drum. In other words, the fibers can bounce or fly away from the surface of the rotating drum. In addition, the fluid used to attenuate the filaments can also strike the rotating drum and dislodge filaments that are already deposited on the drum. The fluid blast can also help to scatter any filaments that have bounced off the surface of the drum due to the high velocity of the advancing filaments. The loss of the filaments from the drum reduces the efficiency of the process. In addition, the stray filaments can cause a maintenance problem in the general vicinity of the rotating drum.

According to the invention, there is provided apparatus for collecting strands formed from streams of molten material issuing from orifices in a feeder having a blower positioned to direct fluid into contact with streams of molten material to attenuate the streams into filaments. A walled passageway is positioned for the passage therethrough of the fluid from the blower and the filaments. The passageway is adapted with a plurality of apertures adapted for the passage of a fluid therethrough. Means for collecting the filaments into a continuous strand is positioned for contact with the filaments passed through the walled passageway.

There is also provided, according to the invention, a method for collecting strands formed from streams of molten material issuing from orifices in a feeder comprising directing a fluid into contact with the streams of molten material to attenuate the streams into filaments. Separating the filaments from a portion of the fluid in a walled passageway, the walls of the passageway adapted with a plurality of apertures adapted for the passage of a fluid therethrough. Collecting the filaments into a continuous strand after the filaments have passed through the passageway.

The invention can be used to form filaments from almost all heat-softenable, filament forming material. The invention is particularly useful, however, in forming glass filaments. Accordingly, the invention will be described in terms of attenuating glass filaments. However, it should be understood that the invention can be used to attenuate other materials into filaments.

DESCRIPTION OF THE DRAWINGS

FIG. 1 is a front elevation view of the filament forming apparatus.

FIG. 2 is a side elevation view of the filament forming apparatus.

In FIGS. 1 and 2 there is shown a feeder 10 for supplying molten glass that is to be formed into filaments from either a bushing having tips or a tipless bushing. The invention will be explained with reference to the former. The lower region 12 of the feeder contains a plurality of tips 14. Each of the tips is adapted with an aperture 16 that opens through the tip and into the feeder.

A pair of blower elements 20 are positioned along each side of the longitudinal row of tips in the feeder. The blower elements are in spaced apart relationship with respect to the tips on the feeder. An inlet 22 is positioned at one end of the blower for introducing a fluid into the blower. One surface of each blower element is adapted with a plurality of openings 24.

A skirt 40 is connected to the lower region of the blower elements and defines a passageway that is preferably rectangular. The skirt has sidewalls 42.

A plurality of spray nozzles 50 is used to spray a coating onto the filaments that exit from the skirt. Conduit 52 connects the spray nozzles with a source of coating material, not shown.

Passageway 60 is positioned for the passage therethrough of the filaments and the fluid from the blower. The walls of the passageway are adapted with a plurality of apertures 64 and the apertures are adapted for the passage of a fluid therethrough. The diameter of the apertures is from about ¼ to about ¾ of the length of the shortest filaments that are attenuated. The apertures in the passageway should comprise from about 40 to about 75% of the surface area of the walls that form the passageway. In practice it has been found desirable to have the apertures comprise approximately 55% of the surface area of the walls of the passageway.

Rotatable drum 70 is positioned for contact with the filaments passed through the walled passageway. The circumferential wall of the rotatable drum is adapted with a plurality of apertures 74. The chamber 76 of the drum is connected to a suitable source of vacuum, not shown.

In operation, molten material passes from the feeder through the orifices in the tips in the form of streams. The streams flow from the tips through the passageway between the blower elements 20. Fluid passing from the openings 24 in the blower elements contact or engage the streams of molten material and attenuate the streams into filaments. The attenuated filaments pass into the passageway formed by the skirt 40. The fluid passing through the openings 24 creates a flow pattern in the skirt 40 which causes the attenuated filaments to strike the walls of the skirt and break. As the discontinuous fibers exit the skirt 40, spray nozzle 50 spray a coating onto the filaments.

As the filaments enter the passageway 60, the filaments are traveling at approximately the same speed as when attenuated by the blast of fluid from the blower 20. The apertures 64 in the sidewalls of the passageway allow the fluid from the blower to pass therethrough. As the apertures comprise from about 40 to about 75% of the surface area of the walls of the passageway, a substantial portion of the fluid from the blower is dissipated through the apertures. A major portion of the fluid passes through from about ⅓ to about ⅔ of the apertures located in the walls of the passageway. In practice, it has been found that the ⅓ to ⅔ of the apertures through which the fluid passes will be the apertures located closest to the inlet end of the passageway. Since the diameter of the apertures is less than the length of the shortest filaments that are attenuated, the filaments are maintained in the passageway while the fluid passes through the apertures. Because the fluid passes through the apertures, the speed of the fluid in the passageway is reduced. As the speed of the fluid is reduced, the speed of the filaments traveling in the passageway is also reduced. In practice it has been found that the speed of the fluid and the filaments in the passageway is reduced by about 20 to about 40 percent by the passage of the fluid from the passageway.

As the filaments leave the passageway 60 they are deposited onto rotatable drum 70. The passageway confines the moving filaments in a group and directs the filaments towards the drum so that attenuated filaments contact the surface of the drum. The vacuum in the interior 76 of the drum acts through apertures 74 to cause the filaments to adhere to the surface of the drum. Since a portion of the fluid from the blower has passed through the apertures in the walled passageway, the filaments will be traveling at a lower speed and will, accordingly, more easily adhere to the surface of the drum. The vacuum of the drum will cause fluid around the exterior of the passageway to be induced or drawn into the passageway through from about ¼ to about ⅓ of the apertures. In practice, it has been found that the ¼ to ⅓ of the apertures through which the fluid is induced will be the apertures located closest to the exit end of the passageway.

As the filaments are collected on the rotating drum 70, the filaments are compacted into a continuous strand and the strand is then removed from the rotating drum. The continuous strand of discontinuous filaments can then be further processed or wound into a package.

Having described the invention in detail and with reference to the drawings, it will be understood that such specifications are given only for the sake of explanation. Various modifications and substitutes other than those cited can be made without departing from the scope of the invention as defined by the following claims.

I claim:

1. A method comprising;
    advancing a stream of gas containing filaments;
    providing a walled passageway having a first opening adapted to receive said advancing stream of gas and filaments, a second opening adapted to permit the egress of said filaments therefrom, and a plurality of apertures in said walled passageway between the first opening and the second opening;
    providing a foraminous surface at said second opening;
    applying a vacuum to said surface to collect the filaments thereon, the walled passageway, foraminous surface and vacuum being adapted to (1) separate at least a portion of said stream of gas from said filaments and move at least a portion of such gas outwardly through said apertures in the walled passageway adjacent said first opening to reduce the velocity of the advancing filaments and (2) draw gas at the exterior of the walled passageway into the interior thereof through said apertures in the walled passageway adjacent the second opening.

2. The method of claim 1 wherein the velocity of the advancing filaments at the second opening is within the range from about 60 to about 80 percent of the velocity of the filaments at the first opening.

3. The method of claims 1 wherein the filaments are collected at the foraminous surface in the absence of a substantial amount of said filaments moving through said aperatures in the walled passageway.

4. The method of claim 1 wherein said gas separated from the filaments moves through from about ⅓ to about ⅔ of said apertures and said gas at the exterior of the walled passageway is drawn through from about ¼ to about ⅓ of said apertures.

5. The method of claim 4 further comprising attenuating streams of molten material into filaments by said stream of gas.

6. Apparatus comprising:
    means for providing filaments in an advancing stream of gas;
    a walled passageway having a first opening adapted to receive said advancing stream of gas and filaments, a second opening adapted to permit the egress of said filaments therefrom, and a plurality of apertures in said walled passageway between the first opening and the second opening;
    a foraminous surface positioned at said second opening; and
    means for applying a vacuum to said surface to collect the filaments thereon, the walled passageway, foraminous surface and vacuum being adapted to (1) separate at least a portion of said stream of gas from said filaments and to move at least a portion of such gas outwardly through said apertures adjacent the first opening to reduce the velocity of the advancing filaments, and (2) draw gas at the exterior of the walled passageway into the interior thereof through said apertures in the walled passageway adjacent said second opening.

7. The apparatus of claim 6 wherein said apertures comprise from about 40 to about 75 percent of the surface area of the sidewalls of said walled passageway.

8. The apparatus of claim 6 wherein the diameter of said apertures is within the range of from ¼ to about ¾ of the length of said filaments.

9. The apparatus of claim 6 wherein said means for providing filaments in an advancing stream of gas is comprised of a feeder for flowing streams of molten material and a blower to direct said stream of gas into contact with said streams of molten material to attenuate said streams of molten material into filaments.

10. The apparatus of claim 9 wherein said foraminous surface is a rotatable drum having a circumferential surface adjacent the second opening.

* * * * *